Figures 1, 2:
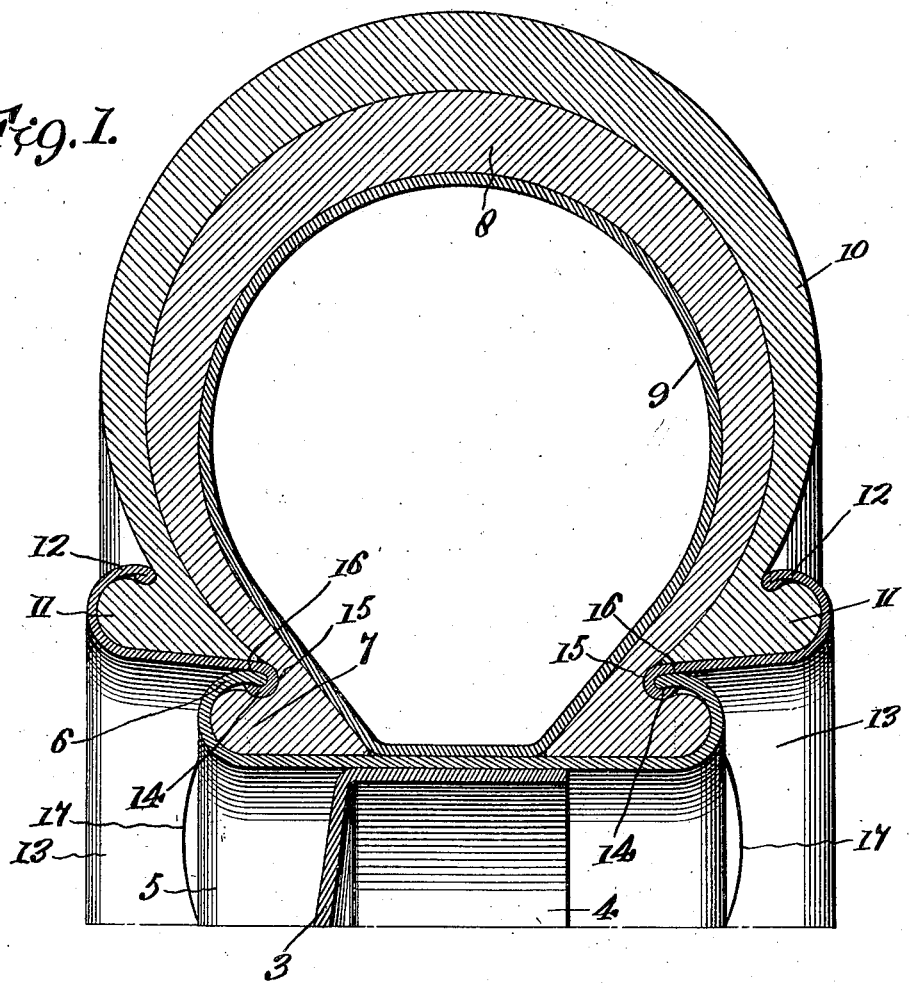

Sept. 16, 1924.  H. E. JONES  1,508,978

ATTACHMENT FOR TIRES

Filed Aug. 31, 1923

Inventor
Harry E. Jones
by Wilkinson & Giusta
Attorneys

Patented Sept. 16, 1924.

1,508,978

UNITED STATES PATENT OFFICE.

HARRY E. JONES, OF EL PASO, TEXAS, ASSIGNOR OF ONE-THIRD TO DANIEL E. FOWLER AND ONE-THIRD TO FRANK R. McKAY, BOTH OF EL PASO, TEXAS.

ATTACHMENT FOR TIRES.

Application filed August 31, 1923. Serial No. 660,350.

*To all whom it may concern:*

Be it known that I, HARRY E. JONES, a citizen of the United States, residing at El Paso, in the county of El Paso and State of Texas, have invented certain new and useful Improvements in Attachments for Tires; and I do hereby declare the following to be a full, clear, and exact description of the invention, such as will enable others skilled in the art to which it appertains to make and use the same.

The present invention relates to improvements in vehicle tires and consists more particularly in a double tire arrangment with fastening devices to secure the same to the usual rim.

An object of the invention is to provide for the holding of a second casing or shoe about the present tire in order to substantially double the thickness to avoid puncturing and to further yield greatly increased smoothness in the riding qualities of the vehicle.

Further objects of the invention are to provide simple and inexpensive attachments adapted to clamp a second tire casing of usual form and construction about the tire on the rim, the attachments being such as to cooperate with the flanges of the rim upon which the inner tire is placed.

With the foregoing and other objects in view, the invention will be more fully described hereinafter, and will be more particularly pointed out in the claim appended hereto.

In the drawings, wherein like symbols refer to like or corresponding parts throughout the several views, Figure 1 is a cross section through an improved tire and rim constructed according to the invention, and Figure 2 is a perspective view showing one of the sections of the attachment.

Referring more particularly to the drawings 3 designates the disc wheel having the felly band 4 upon which is seated the clincher rim 5 having the curled flanges 6.

These flanges are adapted in a well known manner to receive the beads 7 of the tire shoe or casing 8 which envelopes the inner tube shown at 9.

According to the invention an auxiliary or supplemental casing or shoe 10 of the same size as the casing 8 is secured about this latter casing and is snugly fitted to the same before inflation. The beads 11 of the outer or supplemental casing 10 are received within the curled flanges 12 of fastening rings or bands. These rings or bands are preferably made up in sections as indicated in Figure 2, preferably in three sections to each side of the tire or six sections to the wheel.

The sections are composed of base portions 13 which receive the inner edges of the beads 11 and from the outside portions of the bases, the flanges 12 are rolled or curled to conform substantially to the shape of the beads 11. These flanges 12 are substantially of the same shape as the clincher flanges 6 of the rim. The inner edges of the sections are returned downwardly and outwardly to provide hooks 14 which conform to and accurately fit the free edge portions of the clincher flanges 6. The arrangement is such that the hooks 14 enter definitely beneath the clincher flanges 6 and they displace the beads 7 to a small extent so as to develop a great pressure upwardly and outwardly from the compressed portion of the bead 7. This bead is made of dense mass and its displacement will create a very great stress upon the hook 14 and upon the rounded nose 15 of the hook.

This rounded nose engages about the side wall of the tire and it is smooth throughout so as not to offer any sharp projections or any relatively thin edges which might cut through the tire at this relatively weak point. Rather the double thickness of the hook and the base 13 reinforces the weak portion of the tire at this point and serve to further hold the beads 7 in the clincher rim, particularly should deflection occur when the beads have a tendency to draw together and become loose from the rim.

Moreover the inner portion of the base 13 lies outwardly on an extensive area of the outer part of the clincher rim 6 as indicated at 16 and this elongated surface affords an effective hold for the sections upon the rim and it furthermore serves to sustain the beads 11 and the side walls of the supplemental tire. The tendency in sustaining the weight of the vehicle is to rotate the sections inwardly but this is successfully overcome by the relatively wide and long surface of contact between the hook 14 and the inner portion of the base 13 upon opposite sides of the clincher rim 6.

As shown in Figure 2 cut out portions or scallops 17 are made in the inner edge of the base 13 by removing the hooks 14 and the doubled portions 15 therewith.

These scallops 17 afford space to receive a tool for prying the sections loose from the rim flanges. With the device as above described two casings may be carried conveniently and at little expense and a greater protection will be afforded, an easier steering of the vehicle and better riding quality in the vehicle and the tires will be less susceptible to puncture and will require less attention and very infrequent replacement.

It is obvious that various changes and modifications may be made in the details of construction and design of the above specifically described embodiment of this invention without departing from the spirit thereof, such changes and modifications being restricted only by the scope of the following claim.

What is claimed is:—

In combination with a rim having clincher flanges and a vehicle tire mounted thereon having compressible beads engaging within the clincher flanges of the rim, of a supplemental casing secured over the tire and having beads extending outwardly of the beads of the tire, and auxiliary rim sections upon both sides of the wheel, said sections composed of base portions lying substantially horizontally beneath the outer supplemental beads and resting directly upon extensive surfaces of the rim flanges, the outer edges of the sections having clincher flanges thereon adapted to engage over the supplemental beads to prevent separation inwardly of the base portions from the supplemental beads, the inner edge portions of the sections being scalloped having between the scallops downwardly and outwardly turned hooks, the outwardly-turned portions of the hooks extending substantially horizontally and parallel with the base portions, said base portions and hooks being separated by substantially the thickness of the rim flanges to avoid rocking in or out of the section on the rim flanges, the hooks being relatively large to compress the tire bead in the rim flanges to avoid inward movement of the hooks.

HARRY E. JONES.